United States Patent [19]
Fischer

[11] Patent Number: 5,255,526
[45] Date of Patent: Oct. 26, 1993

[54] MULTI-MODE AIR CONDITIONING UNIT WITH ENERGY STORAGE SYSTEM

[76] Inventor: Harry C. Fischer, Box 14, Moon, Va. 23119

[21] Appl. No.: 852,307

[22] Filed: Mar. 18, 1992

[51] Int. Cl.⁵ ............................................. F25D 3/00
[52] U.S. Cl. ..................................... 62/59; 62/118
[58] Field of Search ............................ 62/59, 118, 119

[56] References Cited

U.S. PATENT DOCUMENTS

| | | | |
|---|---|---|---|
| 2,185,515 | 1/1940 | Neeson | 62/59 X |
| 4,735,064 | 4/1988 | Fischer | 62/430 |
| 4,831,830 | 5/1989 | Swenson | 62/59 |
| 4,916,916 | 4/1990 | Fischer | 62/199 |

FOREIGN PATENT DOCUMENTS

| | | | |
|---|---|---|---|
| 11191 | 6/1972 | Japan | 62/59 |
| 85346 | 1/1936 | Sweden | 62/59 |

Primary Examiner—William E. Tapolcai
Attorney, Agent, or Firm—Raymond L. Greene

[57] ABSTRACT

A method and air conditioning unit for storing energy and for utilizing stored energy is provided. The air conditioning unit includes a storage tank containing a phase change material, such as water. A plurality of coils are disposed in the storage tank and carry refrigerant. At least one indoor heat exchanger is connected to the coils. An electrical operated refrigerant pump is connected to the coils and is used to pump liquid refrigerant to the indoor heat exchanger when required. A conventional condensing unit is connected to the indoor heat exchanger to provide cooling during normal hours. During peak energy periods, cooling is supplied from ice storage using the refrigerant pump. During low demand or off peak periods the condensing unit operates to freeze ice thereby storing energy in the storage tank.

11 Claims, 5 Drawing Sheets

MULTI-MODE AIR CONDITIONING UNIT WITH ENERGY STORAGE SYSTEM

BACKGROUND OF THE INVENTION

1. Field of the Invention

This invention relates to air conditioning units and more particularly to systems providing stored energy for use during periods of peak electrical energy demand.

2. Description of the Related Art

Current air conditioning units having energy storing systems have had limited success due to several deficiencies. A major deficiency includes the reliance on water chillers which are practical only in large commercial buildings. In moderate or small-sized commercial buildings, no market acceptable solution is available. Prior art systems do not have a suitable method of providing direct cooling, that is, operating with the energy storage medium removed from the system and therefore have efficiency penalties. Further, current systems have no mechanism to adjust varying volume requirements for refrigerant during different operating modes. U.S. Pat. No. 4,735,064 issued to Harry Fischer, the applicant herein, is representative of these devices. The tank or container which is shown in the Fischer patent stores energy during off-peak periods, generally at night, supplies energy during peak periods, generally in late afternoon. Electrical companies encourage the use of off-peak electricity use by lowering their rates during this period and discourage the use of on-peak electricity through higher rates and higher demand penalties. However, even although the prior Fischer device operates to use energy during off-peak times and avoids energy use during on-peak periods, it fails to achieve high-efficiency during shoulder periods, that is, when conventional direct cooling is required and the energy storage devices are by-passed.

Shoulder hours are defined by the electrical utility company and are generally morning hours and late evening hours. Because certain standards are mandated, direct cooling of the system during shoulder hours must reach a high level of efficiency. As a result of this requirement, current systems fall short of the minimum government standards.

There are primarily two methods commonly followed to avoid high electrical demand during peak summer hours. One method is called load shedding in which compressors are shut down during peak periods and cooling is supplied by stored energy such as ice to provide cooling. The other practice is called load leveling in which a smaller compressor is operated continuously. During periods of low cooling demand, energy as ice is stored. During periods of moderate demand, the small compressor unit matches the load requirement. During periods of high demand when the small compressor cannot supply the needed energy, the capacity of the system is supplemented by the melting of ice to make up the difference.

The ice freezing period during low air conditioning demand may be as long as 12-14 hours, contrasting to the peak demand period which may be as short as 3 hours or as long as 10 hours.

Generally, the higher the evaporator temperature the greater the EER of the system. For the "direct cooling" mode, the evaporator temperature is typically 47° F. In the ice freezing mode, in contrast, the evaporator temperature is typically 28° F. This loss of efficiency for ice making is compensated for by lower electrical rates during off-peak hours. Saturday and Sunday generally have no peak hours because the commercial and industrial load is low.

SUMMARY OF THE INVENTION

An object of the invention is to provide an air conditioning unit with energy storage system that operates during off-peak electrical demand hours to store energy for use during peak electrical demand hours.

Another object of the invention is to provide an air conditioning unit which provides efficient operation during direct operation, that is, when the energy storage system is being bypassed.

It is still another object to provide a cost efficient air conditioning system that is simple to install and operate.

It is another object to provide a system which prevents loss of stored energy during hours when the condensing unit can provide all the cooling needed for the building.

The invention is a multi-mode air conditioning unit having a conventional compressor and conventional evaporator sections to which an energy storage system has been added. The energy storage system is connected to the conventional unit through a charging assembly and a discharging assembly. During energy storing, or ice making, the charging assembly acts as a reservoir for excess refrigerant thereby allowing necessary expansion volume in the ice coils. During energy use, or ice melting, the discharge assembly acts as a reservoir for excess refrigerant allowing expansion volume in the evaporator section. Condensation of the refrigerant is accomplished in the ice coil section without the aid of the compressor and with a minimal pressure differential. During direct cooling when the compressor provides refrigerant directly to the evaporator, both charging and discharging assemblies are emptied, thereby flooding the ice coils with refrigerant and removing them from the system.

In accordance with this invention an energy storage container such as the one described in U.S. Pat. No. 4,735,064 may be used. The accumulator shown in U.S. Pat. No. 4,735,064 has been moved to the outside of the tank. In addition, a second small storage tank has been located downstream of the refrigerant pump. A conventional outdoor condensing unit consisting of a compressor, air cooled condenser, and an electrically driven fan constitutes one portion of the system. The conventional indoor cooling coil and its electrically driven blower and return air filter constitutes another part of the system.

Between the outdoor condensing unit and the indoor coil, the ice storage unit is located. The vapor line between the indoor unit and the condensing unit is cut and liquid vapor separator (known in the trade as an accumulator) is located. The liquid line between the condensing unit and the indoor coil is cut and two solenoid valves are installed. One solenoid valve feeds liquid refrigerant to the indoor coil when it is open and the other solenoid valve feeds liquid to the ice coils when ice making is required during off-peak hours. Downstream from each solenoid valve is a thermostatic expansion valve to control flow of refrigerant to the circuit to which it is connected. In addition, a refrigerant pump to connect to the distributor side outlet down stream from the expansion valve that serves the ice freezing tank.

This refrigerant pump is activated during on-peak cooling when all cooling is supplied by ice storage. This refrigerant pump supplies cold liquid to the indoor coil where it evaporates to pick up heat from the room air stream. The vapor and liquid leaving the indoor coil flow to the accumulator and then the bottom opening flow into the freezing coil network where the vapor is condensed by the ice water which surrounds the freezing coils.

BRIEF DESCRIPTION OF THE DRAWINGS

The invention together with further objects and advantages thereof, may be more fully understood by reference to the following detailed description taken in conjunction with the accompanying drawings in which.

DETAILED DESCRIPTION OF THE INVENTION

Figure 1:
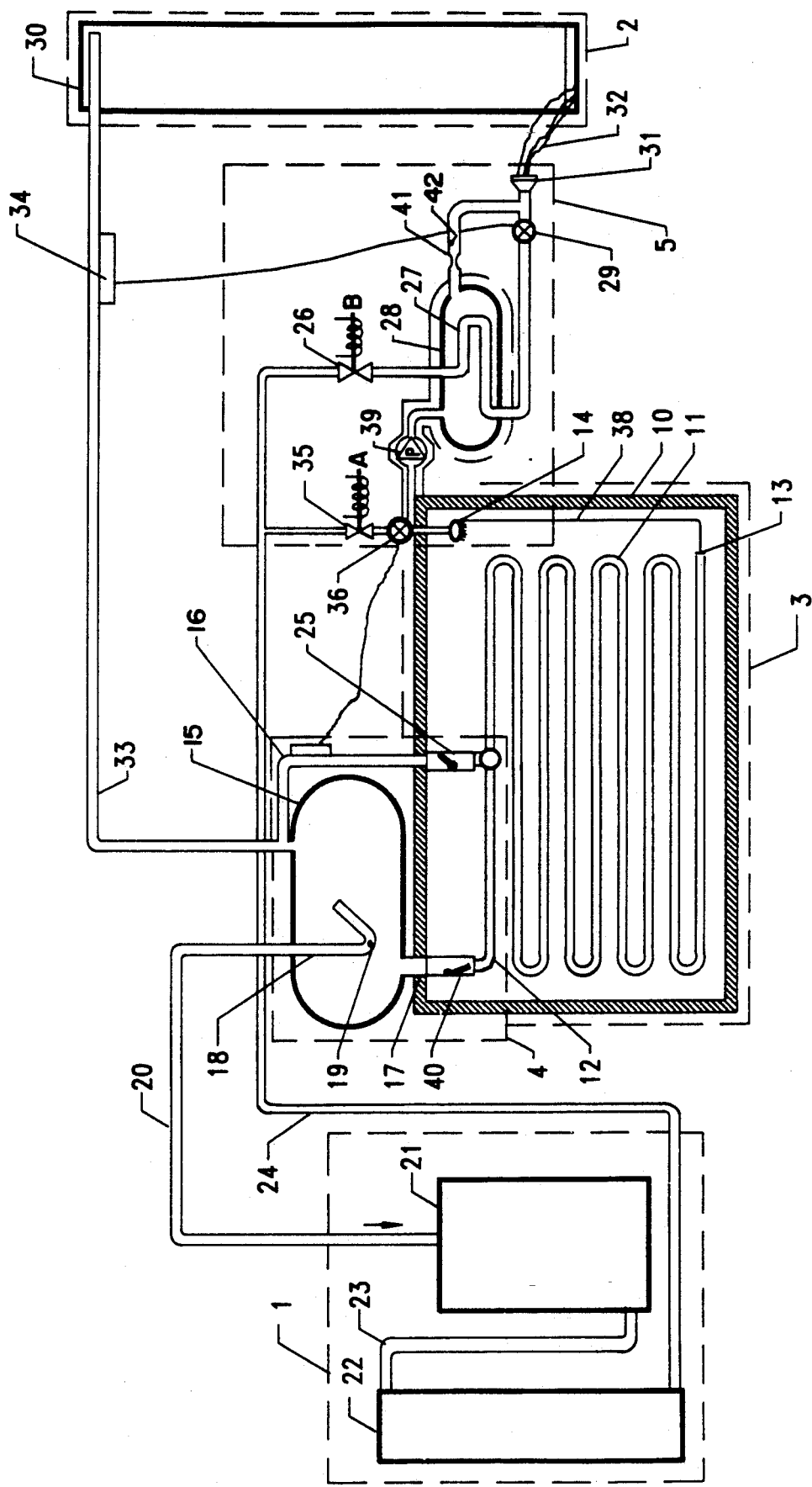
FIG. 1 is a schematic diagram of the apparatus of the subject invention with the energy storage tank shown in cross section.
Figure 3:
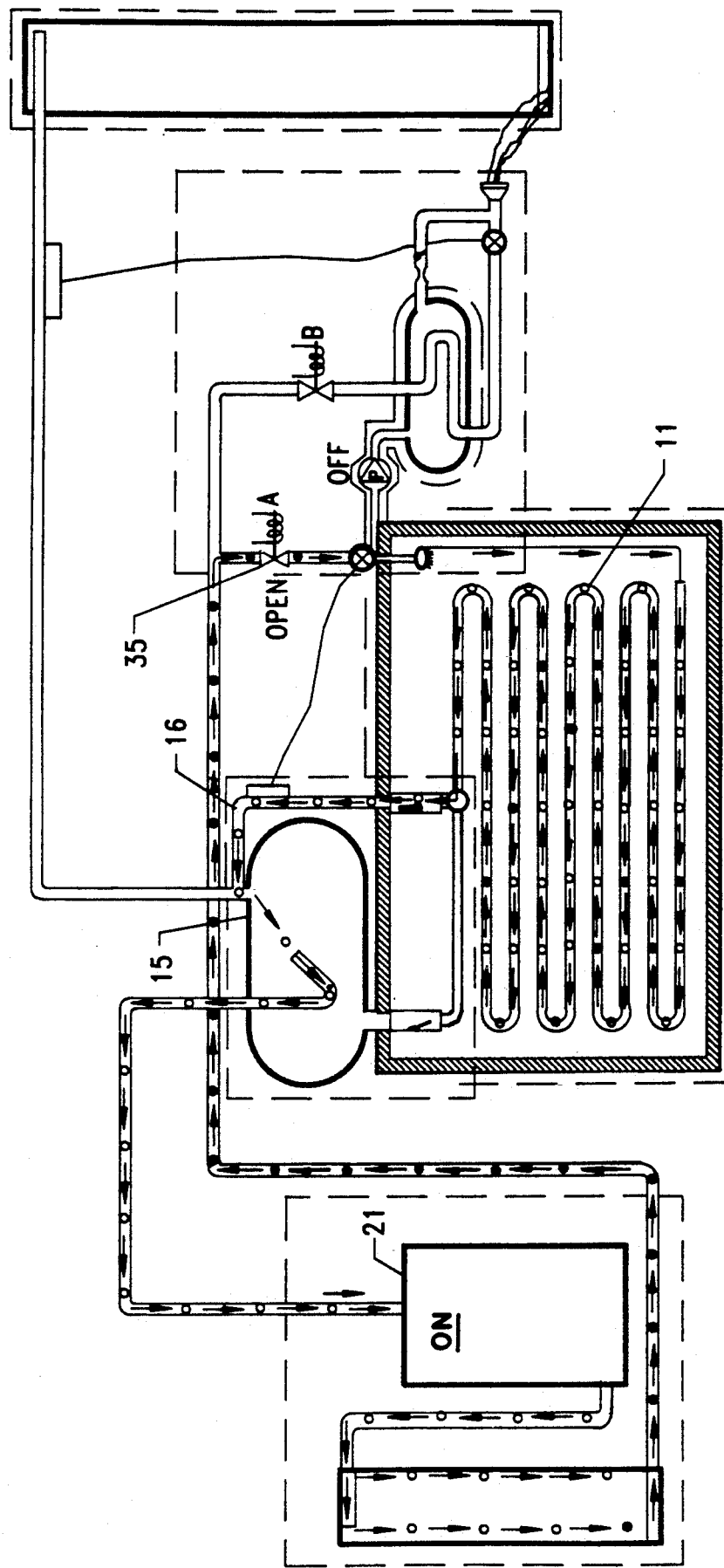
FIG. 3 shows the ice making operating mode.
Figure 4:
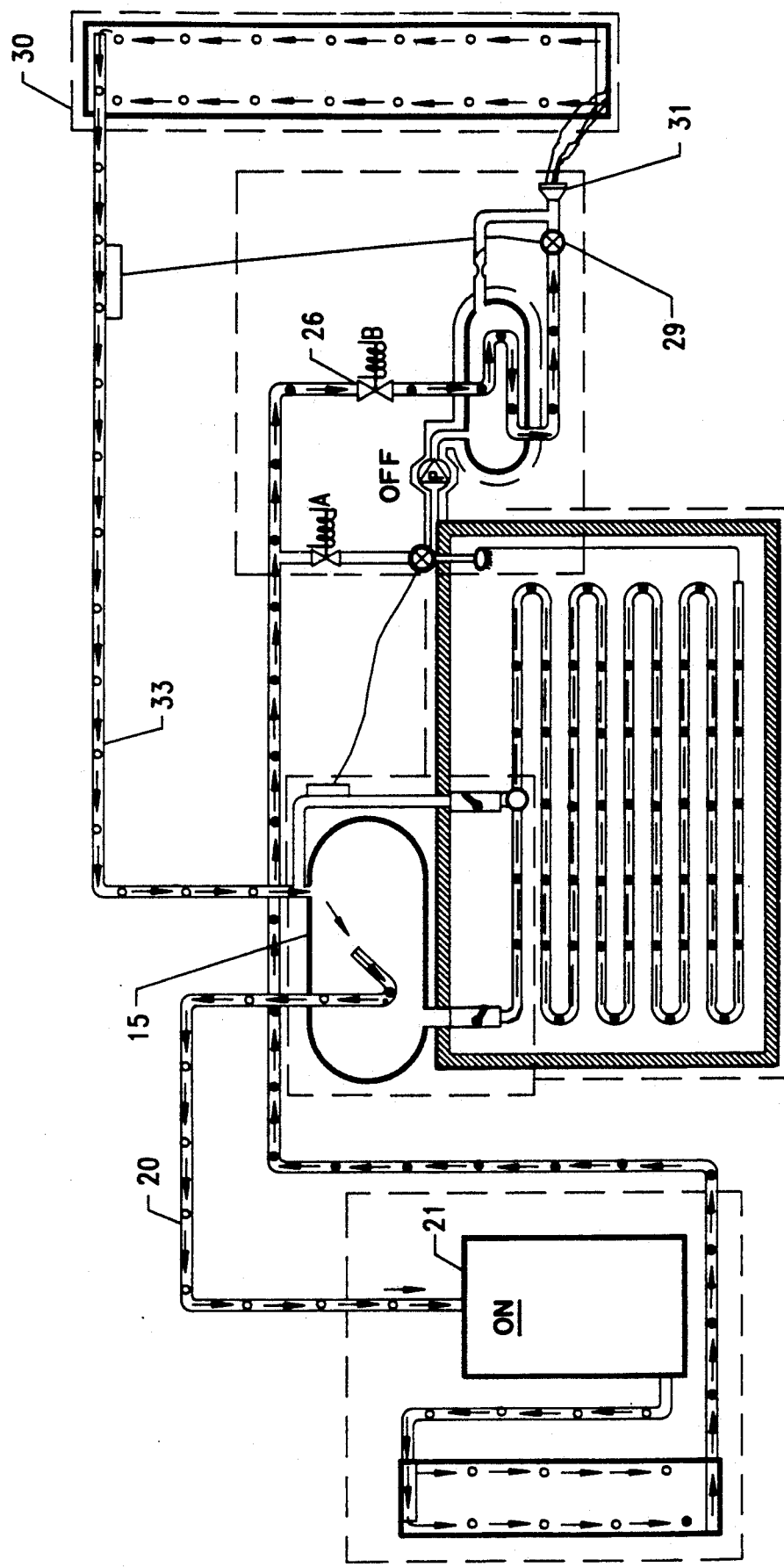
FIG. 4 shows the direct cooling mode.
Figure 5:
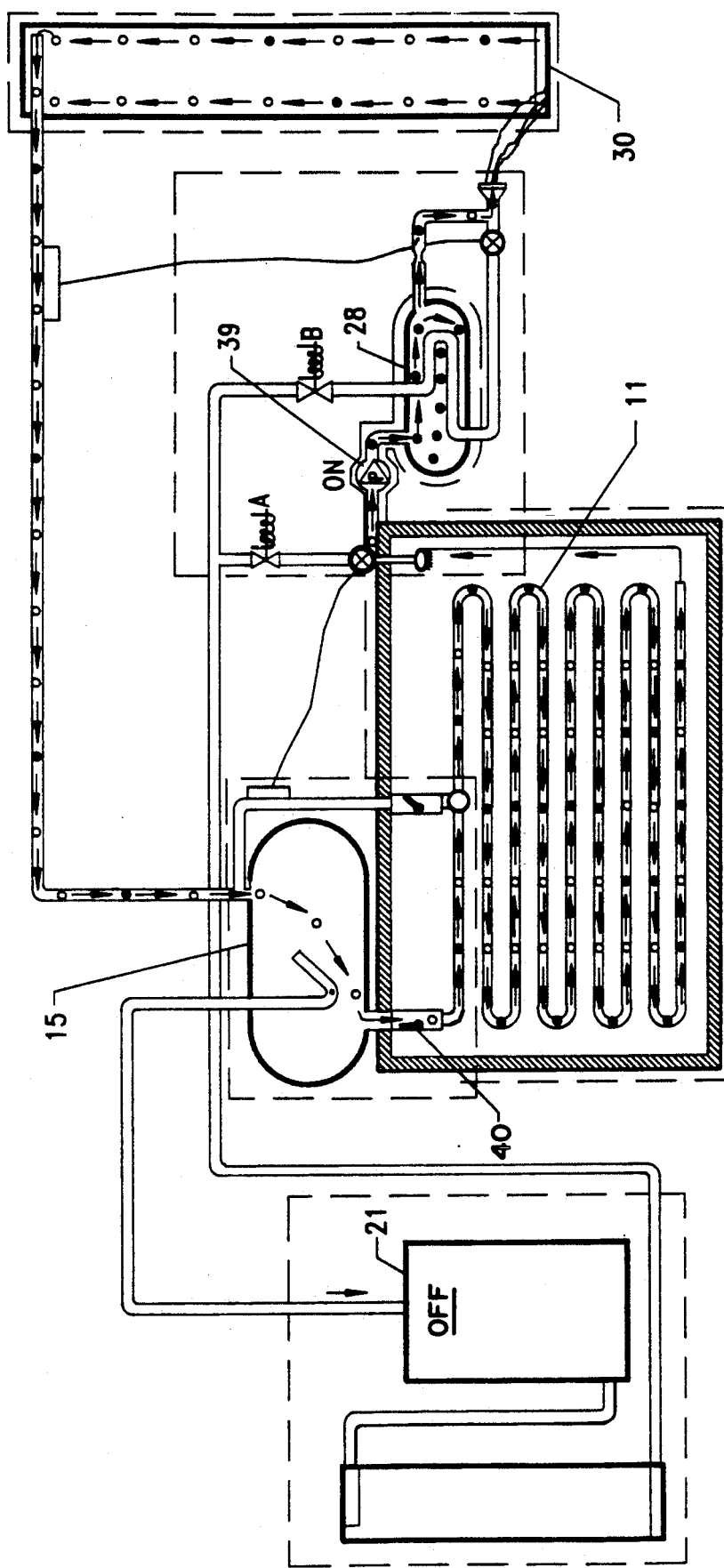
FIG. 5 shows ice melting.

FIG. 1 shows five elements which define the entire system. The condensing unit 1 is a conventional condensing unit which is connected to an indoor coil 2. In the energy storage system, an ice storage tank 10 with its freezing coils is designated as unit 3. The charging assembly 4 and the discharging assembly 5 act in concert to perform the functions of the three principal modes of operation which are shown in FIGS. 3, 4, and 5.

The ice storage tank 10, which contains ice freezing coils 11 made of metal tubing spaced on about 2-inch centers and connected by means of a top header 12 and bottom connections 13 which in turn are connected to a side port distributor 14. The distributor tubes 38 connecting the ice freezing coils 11 to the side port distributor 14 are of smaller diameters than the ice freezing coils 11. Typically, the ice freezing coils 11 are 3/16-inch diameter while the distributor tubes are typically ⅛-inch diameter. These distributor tubes are brazed into the ice freezing coils 11 at each of the several circuits. The actual number of circuits is determined by the size of the ice storage tank 10. The top header 12 is connected to the accumulator 15 by two lines 16 and 17. Line 16 contains a check valve 25 which allows flow to occur upward into the top of the accumulator 15, while line 17 contains a check valve 40 which allows flow downward to header 12, thereby draining liquid and vapor from accumulator 15 when pressure inside the accumulator is greater than the pressure in the ice freezing coils 11 located in tank 10. "J" tube 18 located in the accumulator 15 contains a small diameter hole 19 in its lower portion to allow oil to return to compressor 21 through suction line 20 during compressor operations. The condensing unit 1 includes the compressor 21 and an outdoor coil 22 connected together by line 23.

The liquid line 24 carries the condensed liquid to the remote evaporators, that is, either indoor evaporator coil 30 or ice freezing coils 11. An outdoor fan which causes air to flow over the condenser surfaces is not shown, but operates at the same time as the compressor 21. The liquid refrigerant in liquid line 24 is under high pressure. When direct cooling is required, high pressure liquid flows thru solenoid valve 26 to heat exchanger coil 27 located in refrigerant storage tanks 28. Thereafter, refrigerant flows to thermostatic expansion valve (TXV) 29 which meters refrigerant through a side port distributor to indoor evaporator coil 30. The distributor tubes 32, each feeding one circuit lead to the indoor coil. Typically, a residential indoor coil contains 4 to 6 circuits. Each circuit accounts for between 9000 and 12000 BTU of cooling. The suction or vapor line 33 has sensing bulb 34 clamped to its surface for sensing superheat in the suction line and modulating the flow in TXV to maintain a 4°-7° F. superheat in the vapor line 33 when in the direct cooling mode. The cold vapor passes through "J" tube 18 on returning to the compressor 21 through suction line 20.

During the ice making mode, the liquid refrigerant is directed through solenoid valve 35 to TXV 36 to side port distributor 14. The distributor tubes 38 lead to the ice freezing coils 11 located in tank 10. There are several circuits in the ice storage tank 10. The tank 10 contains ice freezing coils 11 and is also supplied with an air pump to stir the water in the tank during the ice melting mode. An air pump (not shown) may also be supplied with electric heaters to open initial passages through which air can flow. The electric heaters may be operated with a timer or can be turned off by a pressure switch which senses a drop in pressure when a passage is opened.

During the Cooling by Ice Mode, the compressor 21 stops and solenoid valves 26 and 35 close. Refrigerant pump 39 then starts and pumps liquid refrigerant to refrigerant storage tank 28. The volume of this tank allows part of the liquid that had completely flooded the ice coils during direct cooling to be moved from the ice coils to the refrigerant storage tank 28 in order to provide vapor space necessary for the condensing vapor in the ice freezing coils 11. When the upper outlet of the storage tank is reached, the liquid will flow through a restrictor 41 and check valve 42 to the refrigerant distributor 31 and to the indoor evaporator coil 30. The refrigerant pump overfeeds the indoor coil delivering more liquid than the indoor coil can evaporate. This overfeed means that both liquid and vapor will be flowing through suction line 33 to accumulator 15. The liquid and vapor leave the accumulator through line 17 and are distributed to the ice freezing coils 11 through top header 12.

Figure 2:
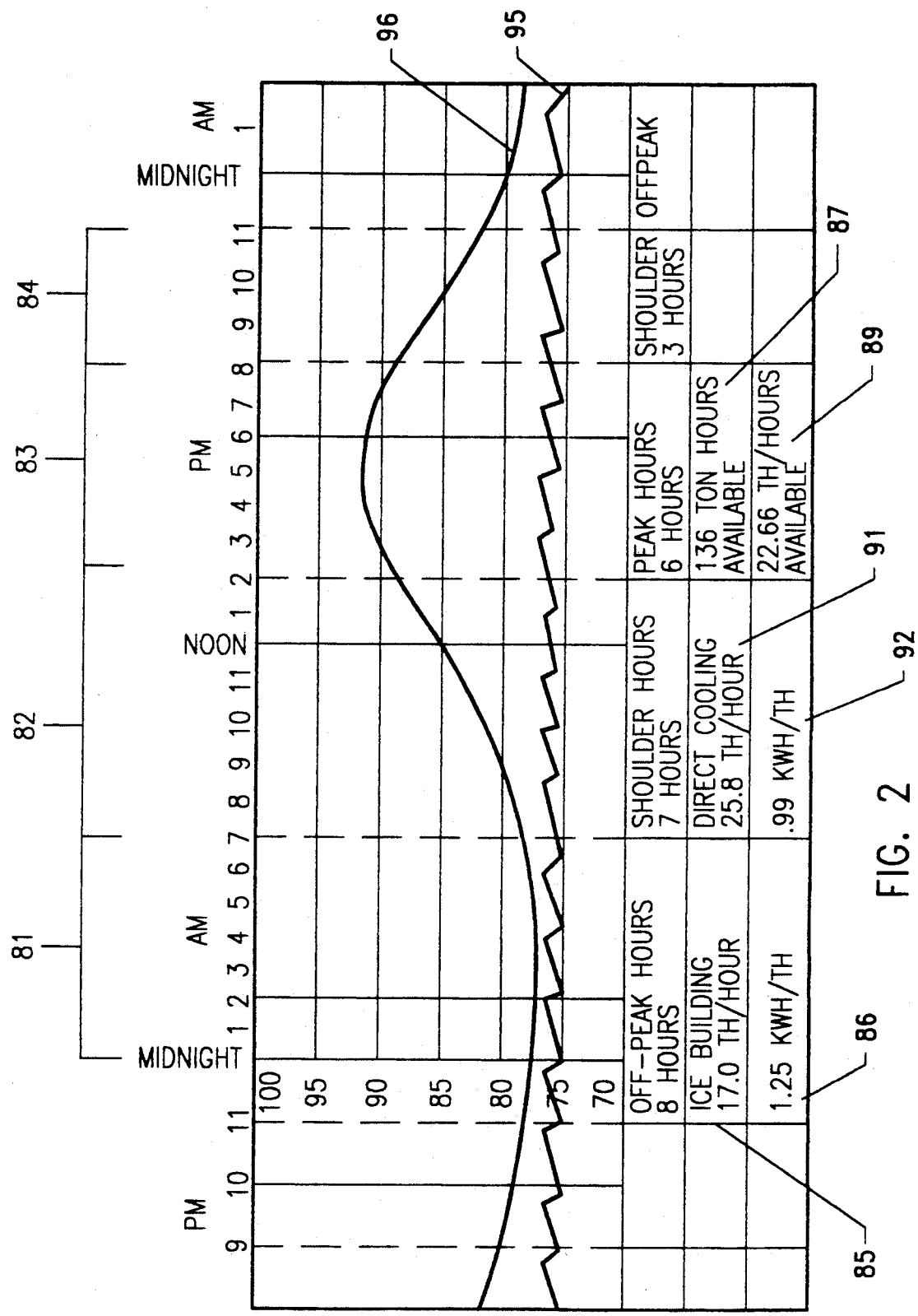
FIG. 2 is a chart depicting operating periods.

Referring now to FIG. 2, the typical daily operating periods can be seen. An outdoor temperature variation 96 for a typical summer day for this example. The indoor temperature 95 is shown representing the cycling of the air conditioning equipment. Starting at 11:00 p.m. the previous night during off-peak hours 81, the ice-making mode begins. The ice-making mode continues throughout the off-peak hours until 7:00 a.m. Thereafter, the mode changes to direct cooling during the shoulder hours 82. After 2:00 p.m., during peak hours 83, the mode changes to Cooling-by-Ice. Following the peak period 83, some areas have a second shoulder period 84. It can be seen that during the off-peak hours 81, represented here as a typical 8-hour period, ice building 85 is accomplished at the rate of 17.0 ton-hours per hour. Electrical usage 86 during this period is 1.25 KWH/ton-hour. It is to be noted that during direct cooling mode occurring during shoulder hours 82 and 84, direct cooling 91 produces 25.8 ton-hours per hour thereby providing a lower cost 92 of 0.99 KWH/TH. Despite the higher KW/TH requirement during ice making, the significantly lowered electrical rates more than compensate for the additional electricity used to make ice.

Referring to peak hours 83 on the figure, electrical rates are set a substantially higher level than any other period. Further, demand charges are assessed during this period. As a result, electricity can cost up to four times more than during off-peak hours. The energy storage provides a means of shifting the load from peak hours to off-peak hours. The energy available 87 during peak hours has been completely generated during non-peak hours. The amount of electricity required to discharge the stored energy is very low, typically 0.1 KWH per ton-hour. The hourly available energy in this example is 22.66 ton hours/hour, represented here by numeral 89. Following peak hours 83, there is generally a second shoulder period 84 to finish the daily cycle.

OPERATION OF THE SYSTEM

For further clarity, the three operating modes of the system will be described. Operation of the system for the ice making can be seen in FIG. 3. In this mode, the compressor 21 is on and solenoid valve 35 is open. Refrigerant flows to the ice freezing coils 11 where it is evaporated. The vapor flows thru line 16 to accumulator 15. This vapor pushes out some liquid stored in coils 11 during direct cooling. Thereby allowing vapor space in cool coils 11. When the evaporator temperature drops to 20° F. the ice making is terminated even though there may still be time left in the off-peak period.

Operation of the system in the direct cooling mode is shown in FIG. 4. The compressor 21 is operating and solenoid valve 26 is open allowing liquid refrigerant to flow to expansion valve 29 thru distributor 31 to indoor evaporator coil 30 where it is evaporated at about 47° F. to cool the building. Superheat is regulated so that only refrigerant vapor returns to the compressor via suction line 33, accumulator 15 and suction line 20 to the compressor. In this mode all of coils 11 in the ice tanks are filled with refrigerant because the pressure in the suction line 33 and 20 is greater than the vapor pressure in the ice coils 11. This static filling of the ice coils takes place in about 1½–2 minutes of the direct cooling mode.

Operation of the system in the cooling by ice mode is shown in FIG. 5. Only the refrigerant pump 39 operates in this mode to pump liquid refrigerant from coils 11 to refrigerant storage tank 28. The amount of refrigerant stored is enough to create vapor space necessary to recondense refrigerant vapor evaporated in indoor evaporator coil 30. The refrigerant pump overfeeds the indoor evaporator coil 30 so that both liquid and vapor return to accumulator 15 and re-enter ice freezing coils 11, thru check valve 40 to be condensed. During this mode, an air pump (not shown) stirs the water melted around the cooling coils to increase the heat transfer rate so that the peak cooling demand can be met. When the temperature of the water in the ice tanks reaches 40° F., the cooling by ice mode is terminated so that the temperature and pressure in the ice tank will be lower than the corresponding pressure during the direct cooling mode which follows cooling by ice thus allowing refrigerant to flood the ice coils during direct cooling mode.

SYSTEM VARIATIONS

In some utility areas where peak hours may extend from noon to 10 p.m., there may not be enough off-peak hours to build enough ice for the next day. In this situation a larger two speed compressor is used to make ice using high speed operation. The compressor reverts to low speed during direct cooling operation. With the low speed, the electrical efficiency is highest. The refrigerant pump 39 in FIG. 1 is normally a positive displacement gear pump. This type of pump will not allow flow in either direction when the motor is not operating. In an alternate embodiment, when a vane or turbine pump is used it is necessary to add a solenoid valve to open when the pump is operating and a check valve to prevent reverse flow in the opposite direction. It is understood that a different type of pump can be used without voiding the claims.

The advantages and novel features of the present invention are numerous. During shoulder operations, the entire ice storage system is flooded with refrigerant and is thereby removed from the operating cycle. Thereafter energy is drawn from the ice for cooling without operation of the compressor. Refrigerant is condensed in the ice section by temperature differential alone. This novel feature of condensing the refrigerant in the ice section without use of the compressor permits cooling during peak electrical demand hours with minimal use of electricity. The discharge assembly likewise provides a novel feature allowing refrigerant to be drawn off from the ice section and thereby permitting expansion of the refrigerant also without the use of a compressor. The unit provides automatic selection of load shedding or load leveling, depending on the demand on the system. The system provides for the use of direct expansion cooling during hours when the condensing unit can meet all cooling demands with the highest normal evaporator temperatures. The higher the evaporator temperature the higher the energy efficiency ratio (EER). This means that in all but the period of greatest demand the unit will be operating at maximum efficiency. During periods of greatest demands, cooling will be provided from storage with electrical demands of indoor fans and refrigerant pump only. During off peak ice making, the electrical rates are lower and the temperature out of doors is lower. This combination may not be as efficient electrically, but on a cost basis saves money because of lower energy rates at night and avoided demand charges During off-peak hours, the ice making mode stores cooling for the next day. Ice freezing is terminated by suction pressure. When the pressure drops to a value corresponding to about 20° F., the compressor stops because over 95% of the water is frozen. During this mode, if space cooling is called, the system stops ice making and provides direct cooling. Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A multi-mode air conditioning unit having a low temperature thermal storage system comprising:
    a) an insulated tank containing water;
    b) a plurality of cooling coils located in said insulated tank;
    c) a top header having a first and second fluid lines for receiving and discharging refrigerant and further connected to said plurality of cooling coils;

d) an accumulator system for storing liquid refrigerant, for separating vapor from liquid, and for returning oil to a compressor comprising:
an insulated accumulator tank having a first port, a second port and a third port;
a one-way check valve directing flow to said top header connected to the first port;
a main suction line connected to the second port and further connected to an ice oil suction line having a one-way check valve directing flow from said top header to the main suction line; and
a vapor and oil return line having a J-tube configuration with a vapor inlet near the top of the accumulator and an oil return orifice located at the bottom of the J-tube, said vapor and oil return connected to the third port and leading a condensing unit;
e) a plurality of distributor lines connected to the lower ends of said cooling coils;
f) a side outlet distributor connected to said distributor lines;
g) a thermostatic expansion valve attached to said side outlet distributor;
h) a solenoid value receiving refrigerant from a liquid line from a condensing unit and connected to said thermostatic expansion valve;
i) a refrigerant pump connected to the side outlet of said side outlet distributor;
j) an insulated storage vessel having an inlet and high outlet and containing heat exchanger coils;
k) a solenoid valve controlling flow from the liquid line connected to the heat exchanger coils in said storage tank;
l) a second thermostatic expansion valve connected to the heat exchanger coils;
m) a second side port distributor having the side port connected to the high outlet of said storage vessel and having the primary port connected to said second thermostatic valve; and
n) a plurality distributor lines connected to said second side port distribution and further leading a conventional indoor coil.

2. A multi-mode air conditioning unit having a low temperature thermal storage system comprising:
a) a condensing assembly having a compressor section and a condensor section;
b) means for storing energy comprising an insulated tank having a plurality of cooling coil and using a phase change material connected to said condenser assembly;
c) means for inactivating the storage system by flooding the coils with refrigerant;
d) means for extracting energy from the storage section; and
e) an indoor evaporator coil receiving energy directly from the compressor or from said means for storing energy when the compressor is not operating.

3. A multi-mode air conditioning unit having a low temperature thermal storage system as in claim 2 wherein said plurality of cooling coils are small diameter 3/16" O.D. tubes.

4. A multi-mode air conditioning unit having a low temperature thermal storage system as in claim 2 wherein said means for inactivating the storage system comprises an accumulator tank and storage tank assembly.

5. A multi-mode air conditioning unit having a low temperature thermal storage system as in claim 4 wherein said accumulator tank and storage tank assembly further comprises a storage tank having a heat exchanger for purpose of boiling off stored refrigerant and thereby sending the refrigerant to the accumulator tank.

6. A multi-mode air conditioning unit having a low temperature thermal storage system as in claim 4 wherein said accumulator tank and storage tank assembly further comprises an accumulator tank having a bottom drain and a check valve such that all liquid refrigerant arriving in the accumulator flows directly into and floods the ice cooling coils.

7. A multi-mode air conditioning unit having a low temperature thermal storage system as in claim 2 wherein means for inactivating further comprises a thermostat which limits energy extraction from the ice reservoir to maintain temperature less than 40 degrees Fahrenheit in the means for storing energy.

8. A multi-mode air conditioning unit having a low temperature thermal storage system as in claim 2 wherein means for extracting energy comprises an accumulator tank and storage tank assembly and valve system setup to store refrigerant in the storage vessel.

9. A multi-mode air conditioning unit having a low temperature thermal storage system as in claim 8 wherein the accumulator tank and storage tank assembly and valve system includes a refrigerant pump for supplying refrigerant during ice melting operations.

10. A multi-mode air conditioning unit having a low temperature thermal storage system as in claim 8 wherein the storage tank has a top-mounted outlet which retains a substantial amount of liquid refrigerant in the storage tank and thereby provides necessary vapor space for condensing vapor returning from an indoor coil to the ice coils.

11. A method for energy storage and extraction in air conditioning comprising the steps of:
providing a two-phase liquid storage tank having freezing coils;
sending liquid refrigerant to the freezing coils;
freezing ice by sending refrigerant to freezing coils during off-peak electrical periods;
flooding freezing coils with liquid refrigerant thereby removing the freezing coils from the system operation;
sending liquid refrigerant to cooling coils during shoulder and peak electrical periods;
drawing off part of refrigerant from flooded freezing coils and storing it;
pumping remaining refrigerant from ice freezing coils to cooling coils to provide cooling without compressor operation; and
condensing vaporized refrigerant in ice freezing coils without compressor operation.

* * * * *